United States Patent
Kanesaki et al.

(10) Patent No.: US 12,017,543 B2
(45) Date of Patent: Jun. 25, 2024

(54) IN-MOTION POWER SUPPLY SYSTEM, AND ABNORMALITY DETERMINATION METHOD FOR ELECTRICAL CHARACTERISTICS IN SAID SYSTEM

(71) Applicant: DENSO CORPORATION, Kariya (JP)

(72) Inventors: Masaki Kanesaki, Kariya (JP);
Mitsuru Shibanuma, Kariya (JP);
Hayato Sumiya, Kariya (JP); Takuya Kiguchi, Kariya (JP); Eisuke Takahashi, Kariya (JP); Shinpei Takita, Kariya (JP); Masaya Takahashi, Kariya (JP); Kazuhiro Uda, Kariya (JP); Yuusei Nakayashiki, Kariya (JP); Kazuyoshi Obayashi, Kariya (JP); Nobuhisa Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 225 days.

(21) Appl. No.: 17/505,136

(22) Filed: Oct. 19, 2021

(65) Prior Publication Data
US 2022/0032778 A1 Feb. 3, 2022

Related U.S. Application Data

(63) Continuation-in-part of application No. PCT/JP2020/010535, filed on Mar. 11, 2020.

(30) Foreign Application Priority Data

Apr. 19, 2019 (JP) .................................. 2019-080132

(51) Int. Cl.
*B60L 3/00* (2019.01)
*B60R 16/033* (2006.01)
*H02J 50/40* (2016.01)

(52) U.S. Cl.
CPC .......... *B60L 3/0046* (2013.01); *B60R 16/033* (2013.01); *B60L 2240/54* (2013.01); *H02J 50/402* (2020.01)

(58) Field of Classification Search
CPC .................................................. H02J 50/402
See application file for complete search history.

(56) References Cited

U.S. PATENT DOCUMENTS 9,880,208 B2   1/2018   Templ
2015/0349543 A1  12/2015   Sakata et al.
(Continued)

FOREIGN PATENT DOCUMENTS

FR   3093871 A1 *   3/2019 .............. H02J 50/12
JP   2008-206326 A   9/2008

*Primary Examiner* — Rexford N Barnie
*Assistant Examiner* — Terrence R Willoughby
(74) *Attorney, Agent, or Firm* — Oliff PLC

(57) ABSTRACT

In an in-motion power supply system with a plurality of power supply segments to supply power to a vehicle, a vehicle position detection unit detects a position of the vehicle relative to each segment. An electrical characteristic acquisition unit acquires electrical characteristics in the segment involved in power transfer, and an abnormality determination unit uses the electrical characteristics to determine whether there is an abnormality in the segment involved in power transfer. The abnormality determination unit shares the electrical characteristics between a subject segment subjected to abnormality determination and at least one of a previous segment previous to the subject segment and a subsequent segment subsequent to the subject segment, and compares the electrical characteristics in the subject segment with at least either the electrical characteristics in the previous segment or the electrical characteristics in the subsequent segment to determine whether the electrical characteristics in the subject segment are abnormal.

13 Claims, 12 Drawing Sheets

(56) References Cited

U.S. PATENT DOCUMENTS

2017/0033615 A1* 2/2017 Asanuma ............ H02J 7/00304
2019/0058358 A1* 2/2019 Bae .................... H02J 7/00308

* cited by examiner

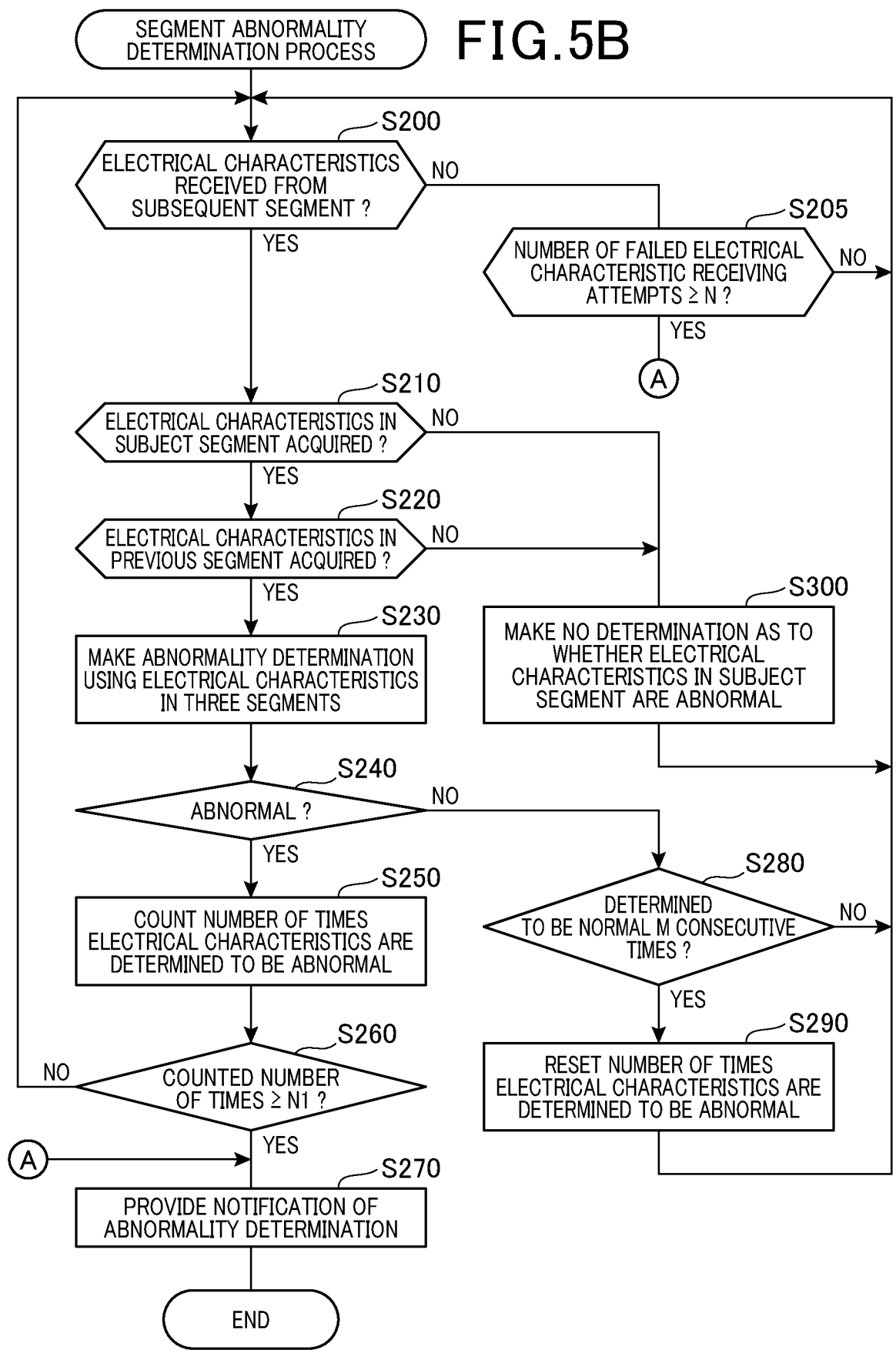

IN-MOTION POWER SUPPLY SYSTEM, AND ABNORMALITY DETERMINATION METHOD FOR ELECTRICAL CHARACTERISTICS IN SAID SYSTEM

CROSS-REFERENCE TO RELATED APPLICATION

The present application is a Continuation in Part of International Application No. PCT/JP2020/010535, filed Mar. 11, 2020, which claims priority to Japanese Patent Application No. 2019-080132 filed on Apr. 19, 2019. The contents of these applications are incorporated herein by reference in their entirety.

BACKGROUND

Technical Field

The present disclosure relates to an in-motion power supply system for contactlessly supplying electric power to a moving vehicle.

Related Art

A contactless power transfer system is known that can detect a failure in its power transmitting driver (inverter). This contactless power transfer system includes a test inverter circuit separate from a main inverter circuit, and detects an initial failure in the main inverter circuit by combining driving of the main inverter circuit with driving of the test inverter circuit.

BRIEF DESCRIPTION OF THE DRAWINGS

In the accompanying drawings:

FIG. 5B is a flowchart of a process of determining whether there is an abnormality in a segment;

DESCRIPTION OF SPECIFIC EMBODIMENTS

There are some issues with the contactless electric power transfer system, as disclosed in JP-A-2008-206326, which include an issue that the test inverter circuit needs to be additionally provided and an issue that failures other than those in the inverter circuits can not be detected. There is another issue that, in the in-motion power supply, the operating condition changes from moment to moment, and thus a single determination is not accurate enough.

One aspect of the present disclosure provides an in-motion power supply system including: a plurality of power supply segments configured to supply power to a vehicle; a vehicle position detection unit configured to detect a position of the vehicle relative to each of the power supply segments; an electrical characteristic acquisition unit configured to acquire electrical characteristics in the power supply segment involved in power transfer when electric power is supplied to the vehicle from the plurality of power supply segments; and an abnormality determination unit configured to use the electrical characteristics to determine whether there is an abnormality in the power supply segment involved in power transfer, wherein the abnormality determination unit shares the electrical characteristics between a subject segment which is the power supply segment subjected to abnormality determination and at least one of a previous segment which is the power supply segment that was involved in power transfer previous to the subject segment and a subsequent segment which is the segment that will be involved in power transfer subsequent to the subject segment, and compares the electrical characteristics in the subject segment with at least either the electrical characteristics in the previous segment or the electrical characteristics in the subsequent segment to determine whether the electrical characteristics in the subject segment are abnormal. With this configuration, it can be accurately determined whether the electrical characteristics in the subject segment are abnormal by sharing the electrical characteristics, such as a current, a voltage and the like, in respective power supply segments, where no new additional circuit is required.

First Embodiment

Figure 1:
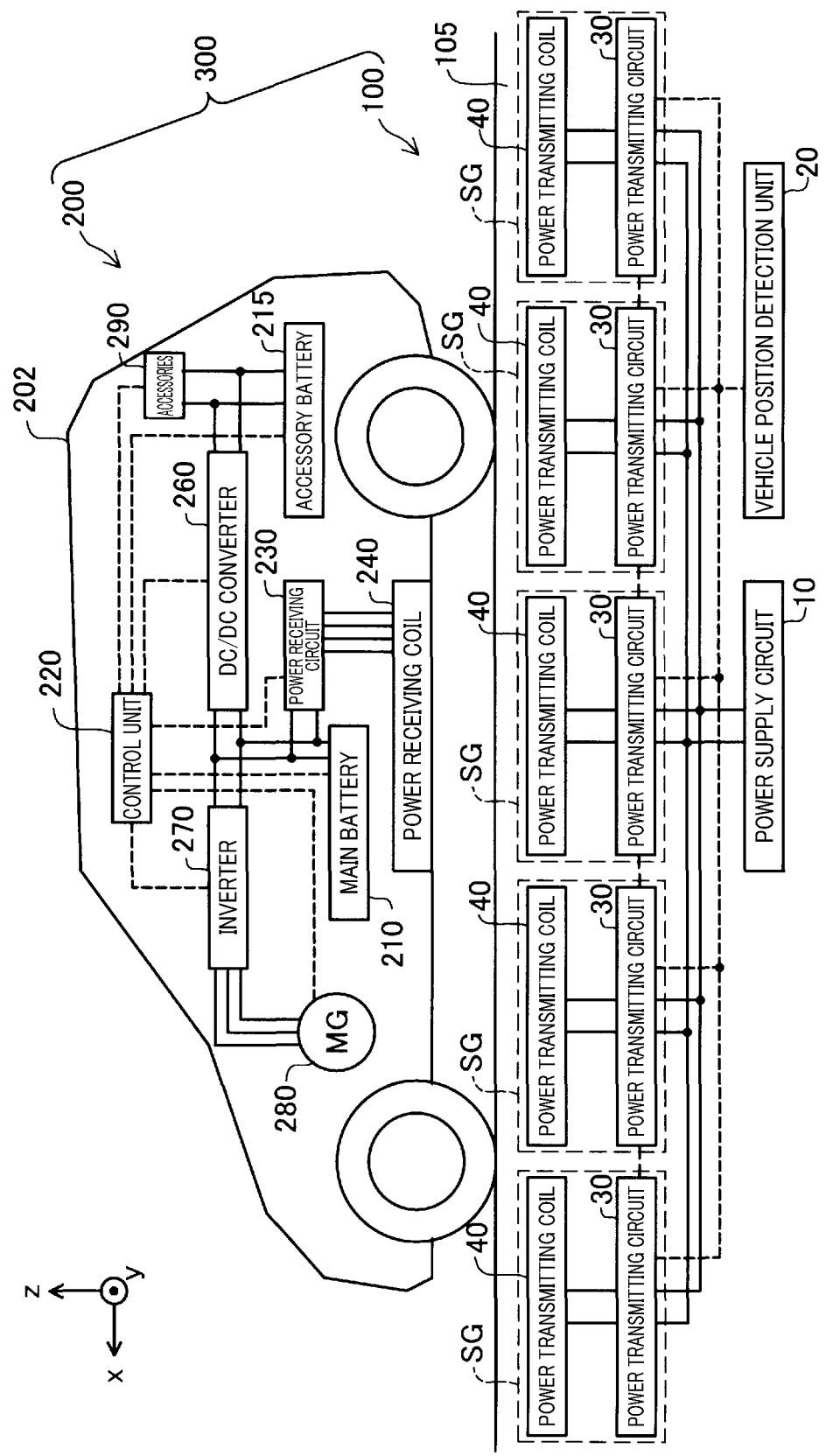
FIG. 1 is an illustration of a contactless power supply system 300.

As illustrated in FIG. 1, a contactless power supply system 300 includes an in-motion power supply system 100 on a road 105 side and an in-motion power receiving system 200 on a vehicle 202 side. The contactless power supply system 300 is a system capable of supplying power from the in-motion power supply system 100 to the vehicle 202 while the vehicle 202 is in motion. The vehicle 202 is configured, for example, as an electric vehicle or a hybrid vehicle. In FIG. 1, the x-axis direction indicates a direction of travel of the vehicle 202, the y-axis direction indicates a lateral direction of the vehicle 202, and the z-axis direction indicates a vertical upward direction.

The in-motion power supply system 100 on the road 105 side includes a plurality of coils 40 for transmitting power (hereinafter also referred to as power transmitting coils 40), a plurality of power transmitting circuits 30 that supply an AC voltage to the respective power transmitting coils 40, a power supply circuit 10 that supplies a DC voltage to the plurality of power transmitting circuits 30, and a vehicle position detection unit 20.

The plurality of power transmitting coils 40 are installed at a predefined depth from the ground surface of the road 105 along the x-direction. Each power transmitting circuit 30 converts the DC voltage supplied from the power supply circuit 10 into a high-frequency AC voltage and applies it to a corresponding one of the power transmitting coils 40, and includes an inverter circuit, a filter circuit, and a resonant circuit. Each pair of the power transmitting coil 40 and the power transmitting circuit 30 are referred to as a power supply segment SG. It may also be referred to simply as a segment SG. The power supply circuit 10 is a circuit that supplies electric power to each of the power transmitting circuits 30. For example, the power supply circuit 10 is configured as an AC-DC converter circuit that rectifies an AC voltage supplied from a commercial power supply and outputs a DC voltage. The power output from the power supply circuit 10 does not have to be a perfect DC and may allow for a certain degree of variability (ripple). The power transmitting circuit in each segment SG may include a DC voltage converter circuit whose DC voltage is adjustable. In the example of FIG. 1, power is supplied to the plurality of segments from the single power circuit 10. In an alternative embodiment, each segment SG may include its own power supply circuit 10.

The vehicle position detection unit 20 detects a position of the vehicle 202. The vehicle position detection unit 20 detects, for example, a position of the power receiving coil 240 (hereinafter also referred to as a power receiving coil 240) based on the magnitude of transmission power and the magnitude of transmission current in each of the plurality of power transmitting circuits 30, and thereby detects the position of the vehicle 202. The plurality of power transmitting circuits 30 perform power transmission using one or more power transmitting coils 40 that are close to the vehicle 202 according to the position of the vehicle 202 detected by the vehicle position detection unit 20. The vehicle position detection unit 20 may use a camera, a search coil, and a laser to detect the position of the vehicle 202.

The vehicle 202 includes a main battery 210, an accessory battery 215, a control unit 220, a power receiving circuit 230, a power receiving coil 240, a DC-DC converter circuit 260, an inverter circuit 270, a motor generator 280, and accessories 290. The power receiving coil 240 is connected to the power receiving circuit 230. The main battery 210, the high voltage side of the DC/DC converter circuit 260, and the inverter circuit 270 are connected to the output of the power receiving circuit 230. The accessory battery 215 and the accessories 290 are connected to the low voltage side of the DC/DC converter circuit 260. The motor generator 280 is connected to the inverter circuit 270.

The power receiving coil 240 is a device that produces an induced electromotive force by electromagnetic induction between it and the power transmitting coil 40. The power receiving circuit 230 includes a rectifying circuit that converts the AC voltage output from the power receiving coil 240 into a DC voltage. The power receiving circuit 230 may include a DC-DC converter circuit that converts the DC voltage generated by the rectifying circuit into a voltage suitable for charging the main battery 210. The DC voltage output from the power receiving circuit 230 may be used to charge the main battery 210 and to drive the motor generator 280 via the inverter circuit 270, and may also be used to charge the accessory battery 215 and to drive the accessories 290 by stepping down the voltage using the DC-DC converter circuit 260.

The main battery 210 is a secondary battery that outputs a relatively high DC voltage for driving the motor generator 280. The motor-generator 280 operates as a three-phase AC motor to generate driving power for driving the vehicle 202. The motor generator 280 operates as a generator and regenerates electric power when the vehicle 202 is decelerating. When the motor-generator 280 operates as a motor, the inverter circuit 270 converts the electric power of the main battery 210 into three-phase alternating current and supplies it to the motor-generator 280. When the motor generator 280 operates as a generator, the inverter circuit 270 converts the three-phase alternating current regenerated by the motor generator 280 into direct current and supplies it to the main battery 210.

The DC-DC converter circuit 260 converts the output of the main battery 210 to a voltage lower than the output voltage of the battery 210 and supplies it to the accessory battery 215 and the accessories 290. The accessory battery 215 is a secondary battery for driving the accessories 290, and its voltage is relatively low. The accessories 290 include an air conditioner of the vehicle 202, an electric power steering system, peripheral devices such as headlights, blinkers, wipers, and various accessories of the vehicle 202.

The control unit 220 controls the inverter 270 and other parts in the vehicle 202. When the vehicle 202 is contactlessly supplied with electric power while moving, the control unit 220 controls the power receiving circuit 230 to receive electric power.

Figure 2:
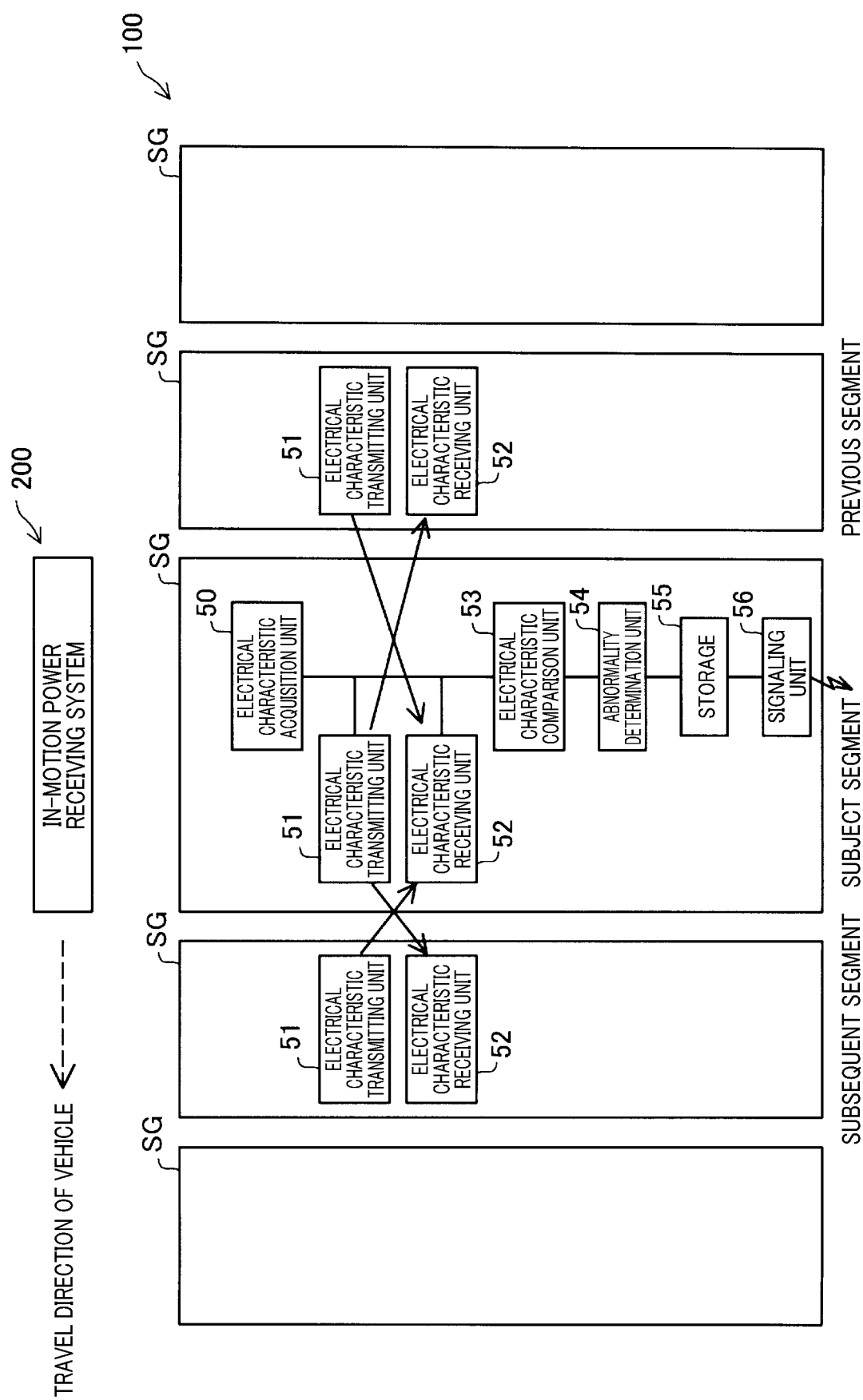
FIG. 2 is a block diagram of an in-motion power supply system.

As illustrated in FIG. 2, each segment SG installed on the road 105 side includes an electrical characteristic acquisition unit 50, an electrical characteristic transmitting unit 51, an electrical characteristic receiving unit 52, an electrical characteristic comparison unit 53, an abnormality determination unit 54, a storage 55, and a signaling unit 56. In FIG. 2, the internal configuration is illustrated only for the segment SG that supplies electric power to the in-motion power receiving system 200 of the vehicle 202. The internal configuration of each of the other segments SG is not shown. The electrical characteristic acquisition unit 50 acquires the current and the voltage of each circuit in the segment SG involved in power transfer. In the present embodiment, at least one of the current and the voltage of each circuit is also referred to as an electrical characteristic. What current and voltage the electric characteristic acquiring unit 50 acquires will be described later. The electrical characteristic transmitting unit 51 transmits the electrical characteristics acquired by the electrical characteristic acquiring unit 50 to the electrical characteristic receiving unit 52 of each adjacent segment SG. The electrical characteristic receiving unit 52 receives the electrical characteristics of each adjacent segment SG from the electrical characteristic transmitting unit 51 of the adjacent segment SG. In this way, electrical characteristics can be shared among plural segments SGs. In some embodiments, the electrical characteristic transmitting unit 51 may transmit the electrical characteristics to the electrical characteristic receiving unit 52 of each segment SG located two or more segments away from the segment SG involved in power transfer, and the electrical characteristic receiving unit 52 may receive the electrical characteristics from the electrical characteristic transmitting unit 51 of each segment SG located two or more segments away from the segment SG involved in power transfer.

The electrical characteristic comparison unit 53 compares the electrical characteristics of its own segment SG with the electrical characteristics of each adjacent segment SG. The abnormality determination unit 54 uses a result of comparison by the electrical characteristic comparison unit 53 to determine whether the electrical characteristics in the own segment SG are abnormal. In what cases the electrical characteristics are abnormal will be described later. The abnormality determination unit 54 counts the number of times the electrical characteristics are determined to be abnormal and stores it in the storage 55. In response to the number of times the electrical characteristics are determined to be abnormal becoming or exceeding a predefined number of times, the signaling unit 56 receives an instruction from the abnormality determination unit 54 and signals that the own segment SG is abnormal. The predefined number may be one. In response to the electrical characteristics being determined to be normal a predefined number of consecutive times, the abnormality determination unit 54 may reset the number of times the electrical characteristics are determined to be abnormal, stored in the storage 55, to 0. This is because, if the electrical characteristics are determined to be normal a predefined number of consecutive times, it may be determined that abnormal values of the electrical characteristics determined by the abnormality determination unit 54 are arising from the effects of noise or the like or variations in measurement. In an alternative embodiment, in response to the number of times the electrical characteristics are determined to be abnormal becoming or exceeding a predefined number of times during a predefined number of determinations, the abnormality determination unit 54 may cause the signaling unit 56 to signal an abnormality. In the embodiment where the count value is not reset unless the electrical characteristics are determined to be normal the predefined number of consecutive times, the abnormality count value may continue to accumulate and it may be determined at some time that there is an abnormality. In order to avoid false signaling in such a case, the abnormality determination unit 54 may cause the signaling unit 56 to signal an abnormality in response to the number of times the electrical characteristics are determined to be abnormal becoming or exceeding the predefined number of times during the predefined number of determinations.

Figure 3:
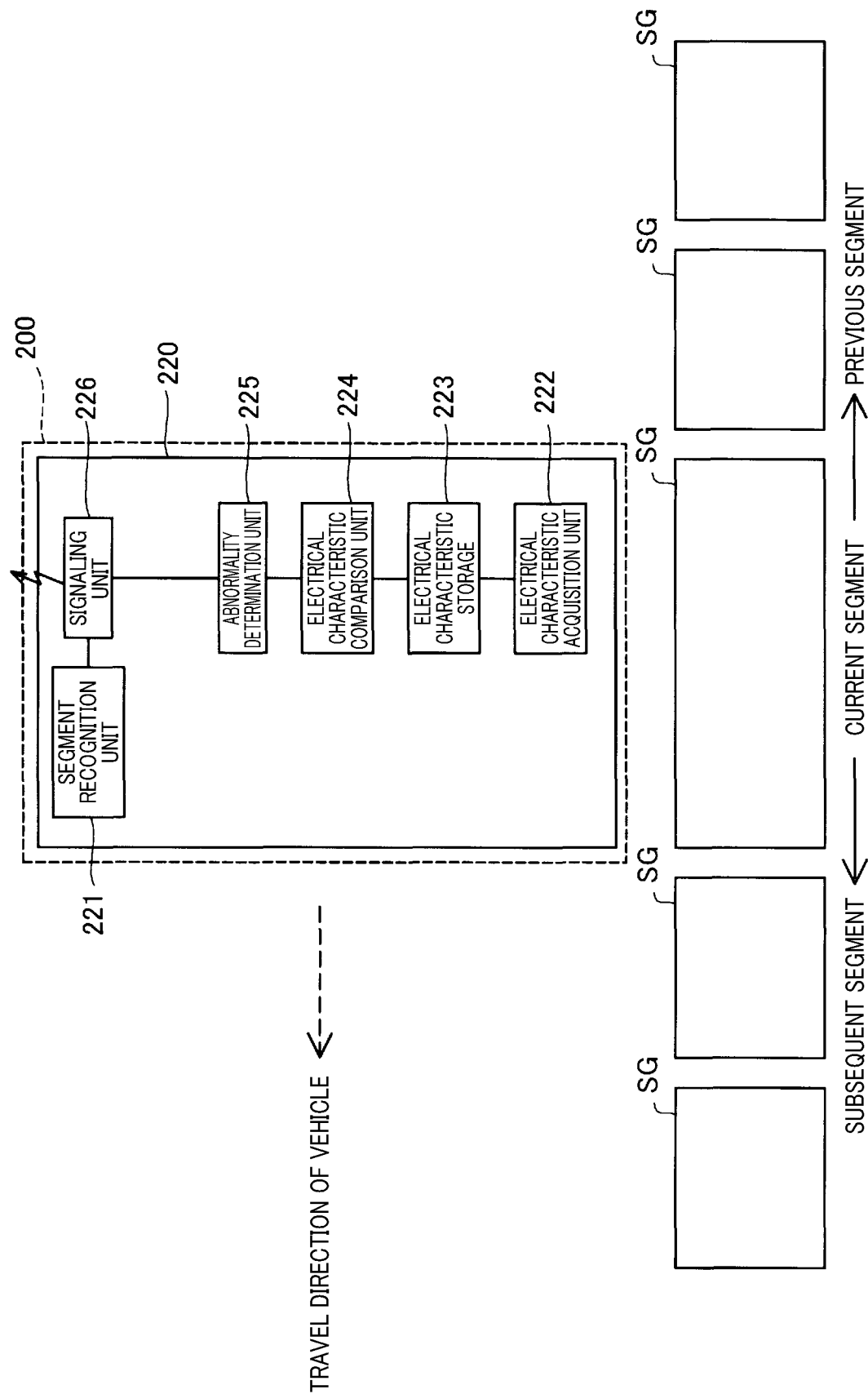
FIG. 3 is a block diagram of an in-motion power receiving system.

As illustrated in FIG. 3, the in-motion power receiving system 200 on the vehicle 202 side includes a segment recognition unit 221, an electrical characteristic acquisition unit 222, an electrical characteristic storage 223, an electrical characteristic comparison unit 224, an abnormality determination unit 225, and a signaling unit 226. The segment recognition unit 221 recognizes from which segment SG the vehicle 202 is supplied with electric power. The electric characteristic acquiring unit 222 acquires the current and the voltage of each circuit of the in-motion power receiving system 200 on the vehicle 202 side. The electrical characteristic storage 223 stores the electrical characteristics acquired by the electrical characteristic acquisition unit 222 in association with from which segment SG electric power is supplied. The electrical characteristic comparison unit 224 compares the electrical characteristics for the respective segments SG. The abnormality determination unit 225 uses a result of comparison by the electrical characteristics comparison unit 224 to determine, for each segment SG, whether the electrical characteristics are abnormal. In response to the number of times the electrical characteristics determined to be abnormal exceeding a predefined number of times, the signaling unit 226 receives an instruction from the abnormality determination unit 225 and signals that there is a segment SG that is abnormal.

Figure 4:
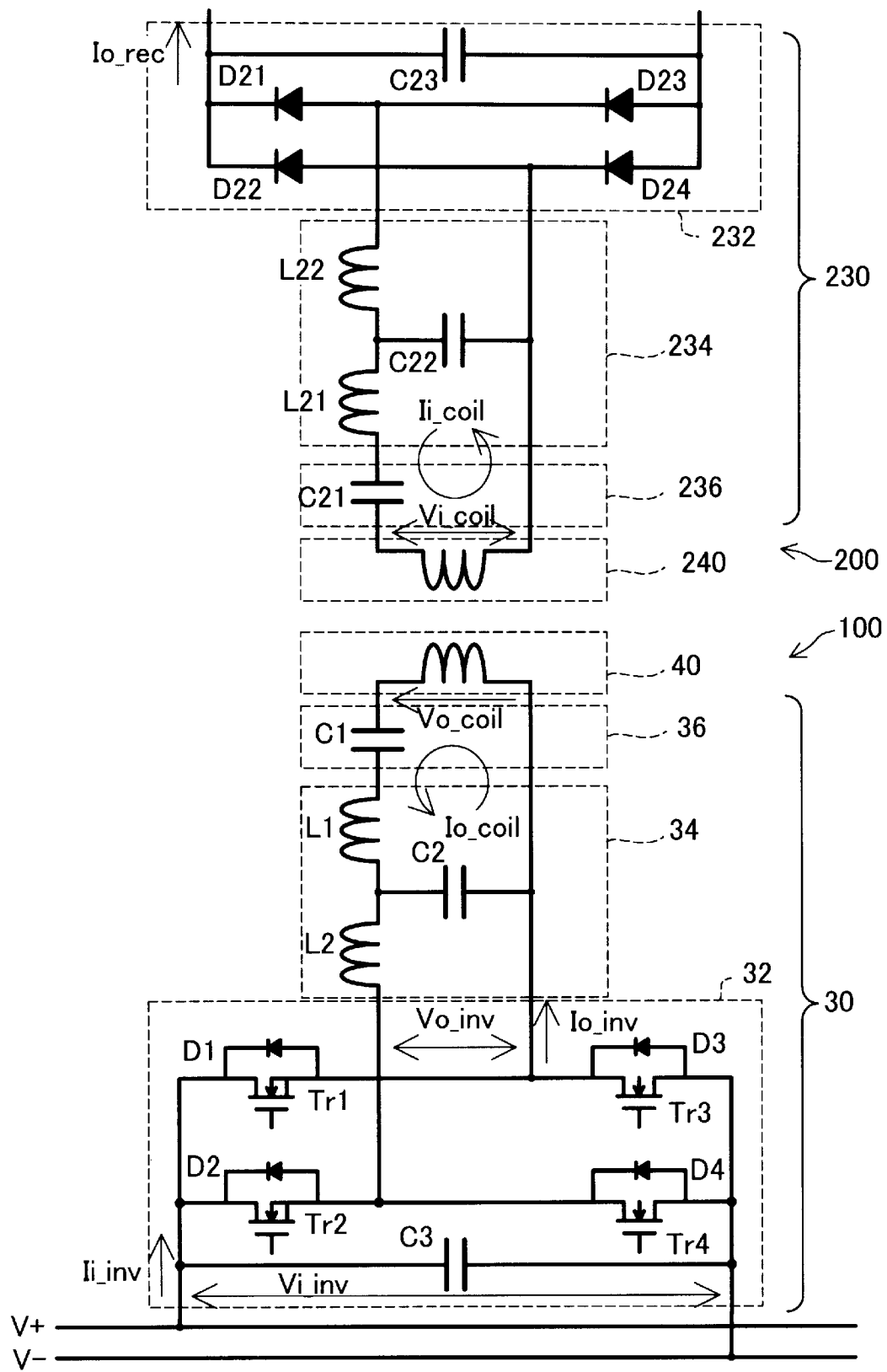
FIG. 4 is an illustration of a power transmitting circuit, a power transmitting coil, a power receiving coil, a power receiving circuit, and electrical characteristics.

As illustrated in FIG. 4, the in-motion power supply system 100 on the road 105 side includes the power transmitting circuit 30 and the power transmitting coil 40. for each segment SG. The power transmitting circuit 30 includes an inverter circuit 32, a filter circuit 34, and a resonant circuit 36. The inverter circuit 32 includes four switching transistors Tr1 to Tr4 and a capacitor C3. The four switching transistors Tr1 to Tr4 forms an H-bridge circuit. The switching transistors Tr1 and Tr3 are connected in series, and the switching transistors Tr2 and Tr4 are connected in series. The switching transistors Tr1 and Tr2 are connected to the positive power line V+, and the switching transistors Tr3 and Tr4 are connected to the negative power line V−. The intermediate node between the switching transistors Tr1 and Tr3 and the intermediate node between the switching transistors Tr2 and Tr4 are connected to the power transmitting coil 40 via the filter circuit 34 and the resonant circuit 36. Protection diodes D1 to D4 are connected to the switching transistors Tr1 to Tr4 in parallel, respectively. The capacitor C3 is a smoothing capacitor provided between the positive power line V+ and the negative power line V−. While the switching transistors Tr1 and Tr4 are on, the switching transistors Tr2 and Tr3 are off. While the switching transistors Tr2 and Tr3 are on, the switching transistors Tr1 and Tr4 are off.

The filter circuit 34 is a T-type filter circuit including two inductors L1 and L2 and a capacitor C2. The resonant circuit 36 is formed of a capacitor C1 inserted in series between the power transmitting coil 40 and the inductor L1 of the filter circuit 34. Therefore, in the present embodiment, the resonant circuit 36 forms a series resonant circuit. Instead of the series resonant circuit, it may be configured to form a parallel resonant circuit in which the capacitor C1 is connected in parallel with the power transmitting coil 40.

The vehicle-side in-motion power receiving system 200 includes a power receiving circuit 230 and a power receiving coil 240. The power receiving circuit 230 includes a resonant circuit 236, a filter circuit 234, and a rectifier circuit 232. The resonant circuit 236 is formed of a capacitor C21 connected in series with the power receiving coil 240. Therefore, in the present embodiment, the resonant circuit 236 is a series resonant circuit. Instead of the series resonant circuit, a parallel resonant circuit in which the capacitor C21 is connected in parallel with the power receiving coil 240 may be used.

The filter circuit 234 is a T-type filter circuit including two inductors L21 and L22 and a capacitor C22. The capacitor C21 of the resonant circuit 236 is connected in series with the inductor L21 of the filter circuit 234. The charging coil 240 is connected to the capacitor C22 of the filter circuit 234.

The rectifier circuit 232 is a bridge rectifier circuit and includes four diodes D21 to D24 and a smoothing capacitor C23. The diodes D21 and D23 are connected in series, and the intermediate node therebetween is connected to the inductor L22 of the filter circuit 234. The diodes D22 and D24 are connected in series, and the intermediate node therebetween is connected to the capacitor C21 of the filter circuit 234 and the power receiving coil 240. The cathode of the diode D21 is connected to the cathode of the diode D22, and the anode of the diode D23 is connected to the anode of the diode D24. The smoothing capacitor C23 is connected in parallel with the four diodes D21 to D24.

Abnormalities in electrical characteristics and examples of possible failures in such cases are described below. The failures described here are examples.

(1) Input voltage $V_{i\_inv}$ of the inverter circuit 32

If the input voltage $V_{i\_inv}$ does not increase, the load of the inverter circuit 32 is assumed to be short-circuited or the inverter circuit is assumed to be short-circuited.

(2) Input current $I_{i\_inv}$ of the inverter circuit 32

If the input current $I_{i\_inv}$ is an overcurrent, the load of the inverter circuit 32 is assumed to be short-circuited. If the input current $I_{i\_inv}$ is a zero current, the load of the inverter circuit is assumed to be open or the inverter circuit 32 is assumed to be open.

(3) Output voltage $V_{o\_inv}$ of the inverter circuit 32

If the output voltage $V_{o\_inv}$ does not increase, the load of the inverter circuit 32 is assumed to be short-circuited or the inverter circuit is assumed to be open or short-circuited.

(4) Output current $I_{o\_inv}$ of the inverter circuit 32

If the output current Io_inv is an overcurrent, the load of the inverter circuit 32 is assumed to be short-circuited. If the output current Io_inv is a zero current, the load of the inverter circuit is assumed to be open or the inverter circuit 32 is assumed to be open.

(5) Current Io_inv of the power transmitting coil 40

If the current Io_inv is a zero current, the power transmitting coil 40 is assumed to be open.

(6) Voltage Vo_inv of the power transmitting coil 40

If the voltage Vo_inv is a zero voltage, the power transmitting coil 40 is assumed to be short-circuited. If the voltage Vo_inv is an overvoltage, the power transmitting coil 40 is assumed to be open.

(7) Voltage Vi_inv of the power receiving coil 240

If the voltage Vi_inv is a zero voltage, the power transmitting coil 40 is assumed to be short-circuited or open.

(8) Current Ii_inv of the power receiving coil 240

If the current Ii_inv is a zero current, the power transmitting coil 40 is assumed to be short-circuited or open.

(9) Current Io_rec of the rectifier circuit 232

If the current Io_rec is a zero current, the power transmitting coil 40 is assumed to be short-circuited or open.

The abnormality determination unit 54 determines, for each of at least one of the above electrical characteristics (1) to (9), whether the electrical characteristic is abnormal. The abnormality determination unit 54 may use two or more of the above electrical characteristics to determine, for each of the two or more of the above electrical characteristics, whether the electrical characteristic is abnormal. In addition, the abnormality determination unit 54 may not only determine whether an abnormality has occurred, but may also determine a position where the abnormality has occurred based on a condition of the abnormality.

Figure 5A:
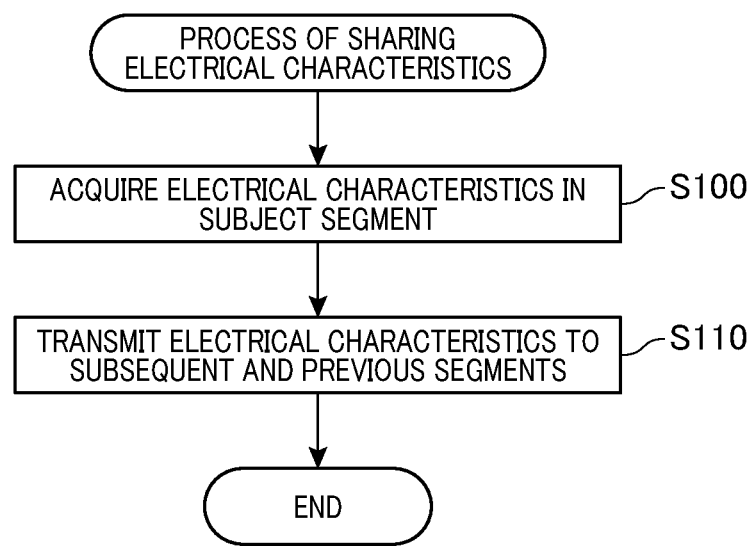
FIG. 5A is a flowchart of a process of sharing electrical characteristics.

A process of sharing electrical characteristics, which is performed by each segment SG, will now be described with reference to FIG. 5A. At step S100, the electrical characteristic acquisition unit 50 of the segment SG that is subjected to abnormality determination (hereinafter referred to as a subject segment SGt) acquires the electrical characteristics in the subject segment SGt. At step S110, the electrical characteristic transmitting unit 51 of the subject segment SGt transmits the electrical characteristics acquired by the electrical characteristic acquisition unit 50 at step S110 to the segment SG previous to the subject segment SGt (hereinafter also referred to as a previous segment SGb) and to the segment SG subsequent to the subject segment SGt (hereinafter also referred to as a subsequent segment SGa). The previous segment SGb means the segment that was the subject segment previous to the current subject segment SGt. The subsequent segment means the segment that will be the subject segment subsequent to the current subject segment SGt. The subject segment SGt switches sequentially from the previous segment SGb to the current subject segment SGt, and from the current subject segment SGt to the subsequent segment SGa, depending on a travel position of the vehicle 202. The previous segment SGb, the subject segment SGt, and the subsequent segment SGa are three consecutive segments. When the electrical characteristic transmitting unit 51 of the previous segment or the subsequent segment performs the process step S110, the electrical characteristic receiving unit 52 of the segment SG that is subjected to abnormality determination receives the electrical characteristics in the previous segment SGb or the subsequent segment SGa, which enables sharing of the electrical characteristics with the previous segment SGb or the subsequent segment SGa.

An abnormality determination process performed by the abnormality determination unit 54 of the subject segment SGt will now be described with reference to FIG. 5B. If the electric characteristic receiving unit 52 of the subject segment SGt determines, at step S200, that the electric characteristics have been received from the electric characteristic transmitting unit 51 of the subsequent segment SGa, the abnormality determination unit 54 proceeds to step S210. If the electrical characteristic receiving unit 52 have not received the electrical characteristics from the electrical characteristic transmitting unit 51 of the subsequent segment SGa, the abnormality determination unit 54 proceeds to step S205. If at step S205 the abnormality determination unit 54 determines that the number of times the electric characteristic receiving unit 52 fails to receive the electric characteristics is equal to or greater than N, the abnormality determination unit 54 proceeds to step S270. If at step S205 the abnormality determination unit 54 determines that the number of times the electric characteristic receiving unit 52 fails to receive the electric characteristics is less than N, the abnormality determination unit 54 repeats step S200.

At step S210, the abnormality determination unit 54 determines whether the electrical characteristic acquisition unit 50 of the subject segment SGt has acquired its own electrical characteristics. The electrical characteristics are at least one of (1) to (9) described above. If its own electrical characteristics have not been acquired, the abnormality determination unit 54 proceeds to step S300 and does not make a determination as to whether the electric characteristics in the subject segment SGt are abnormal. This is because the electrical characteristics in the subsequent segment SGa and the electrical characteristics in the subject segment SGt can not be compared. At step S220, the abnormality determination unit 54 determines whether the electric characteristic acquisition unit 50 of the subject segment SGt has acquired the electric characteristics in the previous segment SGa. If the electrical characteristics in the previous segment SGa have not been acquired, the abnormality determination unit 54 proceeds to step S300 and does not make a determination as to whether the electrical characteristics in the subject segment SGt are abnormal. This is because the electrical characteristics in the subsequent segment SGa, the electrical characteristics in the subject segment SGt, and the electrical characteristics in the previous segment SGb can not be compared. In some embodiments, as if the answer is No at step S200, if at step S220 it is determined that the electrical characteristics in the previous segment SGa have not been acquired, the abnormality determination unit 54 may proceed to step S270 if the number of times the electrical characteristics have failed to be received by the electrical characteristic receiving unit 52 is equal to or greater than N, and the abnormality determination unit 54 may proceed to to step S300 if the number of times the electrical characteristics have failed to be received is less than N.

At step S230, the abnormality determination unit 54 determines whether the electrical characteristics in the subject segment SGt are abnormal using the electrical characteristics in the three segments, that is, the subject segment SGt, the previous segment SGb, and the subsequent segment SGa.

If at step S240 it is determined that the electrical characteristics in the subject segment SGt used at step S230 are abnormal, the abnormality determination unit 54 proceeds to step S250 and proceeds to step S280 if the electrical characteristic of the subject segment SGt are not abnormal, that is, if the electrical characteristic of the subject segment SGt are normal.

At step S250, the abnormality determination unit 54 counts the number of times the electrical characteristics are determined to be abnormal. The abnormality determination unit 54 stores this counted number of times in the storage 55. At step S260, the abnormality determination unit 54 determines whether the counted number of times is equal to or greater than a determination value N1. The abnormality determination unit 54 proceeds to step S270 if the counted number of times is equal to or greater than the determination value N1, and proceeds to step S200 if the counted number of times is less than the determination value N1. In some embodiments, at step S260, the abnormality determination unit 54 may proceed to step S270 if the counted number of times becomes equal to or greater than the determination value N1 during a predefined number of determinations being made.

At step S270, the abnormality determination unit 54 determines that the subject segment SGt is abnormal and provides a notification thereof. For example, the notification is externally transmitted from the signaling unit 56.

At step S280, the abnormality determination unit 54 determines whether the determination that the electrical characteristics are normal has been made M consecutive times. If the determination that the electrical characteristics are normal has been made M consecutive times, the abnormality determination unit 54 proceeds to step S290. If the determination that the electrical characteristics are normal has not been made M consecutive times, the abnormality determination unit 54 proceeds to step S200.

At step S290, the abnormality determination unit 54 resets the counted number of times the electrical characteristics are determined to be abnormal stored in the storage 55. This is because if this counted number of times is not reset at a certain timing, this counted number of times will increase and eventually become equal to or greater than the determination value N1. The resetting timing is not limited to the timing when the determination that the electrical characteristics are normal has been made M consecutive times. For example, the counted number of times the electrical characteristics are determined to be abnormal may be reset every certain period of time, provided that this counted number of times is less than a determination value N2 (<N1). Instead of resetting the counted number of times the electrical characteristics are determined to be abnormal every certain period of time, the abnormality determination unit 54 may reset this counted number of times each time a predefined number of determinations have been made, provided that this counted number of times is less than the determination value N2.

Figure 6:
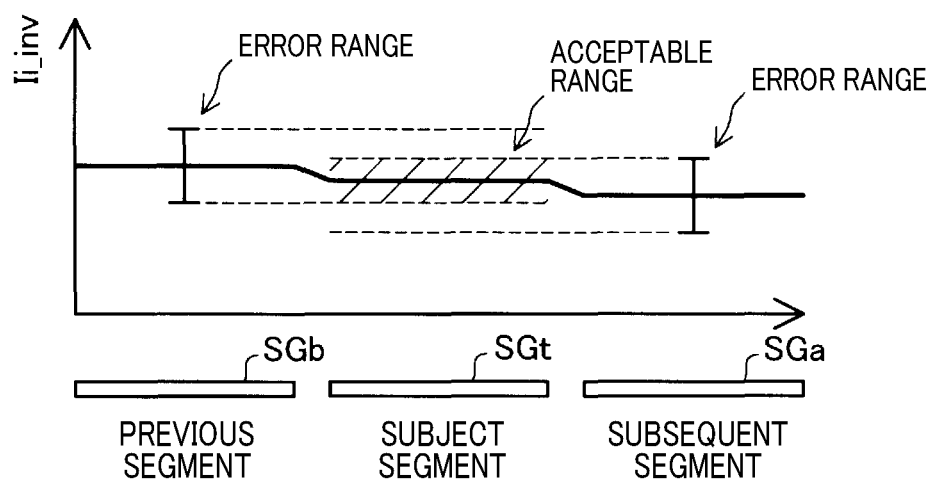
FIG. 6 is an illustration of a method of determining whether electrical characteristics are abnormal.
Figure 7:
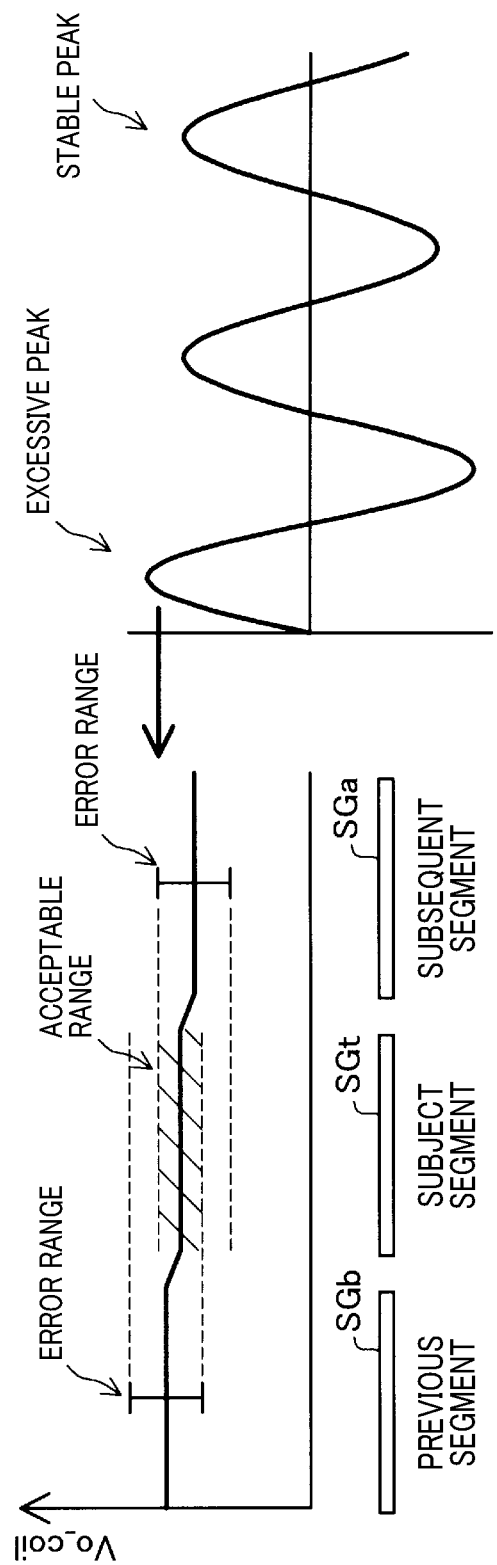
FIG. 7 is an illustration of a method of determining whether AC electrical characteristics are abnormal.

FIG. 6 illustrates an example of a case where the input current Ii_inv of the inverter circuit 32 is used as an electrical characteristic. The abnormality determination unit 54 sets an error range for each of the input current Ii_inv of the inverter circuit 32 of the previous segment SGb and the input current Ii_inv of the inverter circuit 32 of the subsequent segment SGa. The error range for the input current Ii_inv of the inverter circuit 32 of each of the segments SGb and SGa may be set using a percentage of Ii_inv as, for example, Ii_inv±5%, Ii_inv±10%, or the like. Alternatively, the error range for the input current Ii_inv of the inverter circuit 32 of each of the segments SGb and SGa may be set using a numerical range as, for example, Ii_inv±1A, Ii_inv±2A, or the like. The abnormality determination unit 54 sets an acceptable range to an overlap of the error range of the previous segment SGb and the error range of the subsequent segment SGa. The input current Ii_inv of the inverter circuit 32 of the subject segment SGt is determined to be abnormal if it is out of the acceptable range. The input current Ii_inv of the inverter circuit 32 of the subject segment SGt is determined to be normal if it is not out of the acceptable range. The same applies when the input voltage Vi_inv of the inverter circuit 32, the output voltage Vo_inv of the inverter circuit 32, the output current Io_inv of the inverter circuit 32, the current Io_inv of the transmission coil 40, or the voltage Vo_inv of the transmission coil 40 is used as an electrical characteristic. In the case of the AC electrical characteristics, the abnormality determination unit 54 uses peak values as illustrated in FIG. 7. Instead of the peak values, the abnormality determination unit 54 may use the effective value.

Typically, when acquiring electrical characteristics, the electrical characteristics may vary with relative positions of the power transmitting coil 40 of the in-motion power supply system 100 and the power receiving coil 240 of the vehicle 202, that is, due to variations in the degree of coupling between the power transmitting coil 40 and the power receiving coil 240, and noise. Thus, even if there is no abnormality in the segment SG, the electrical characteristics may become abnormal when supplying power to one vehicle, but may become normal when supplying power to another vehicle. However, in the present embodiment, the abnormality determination unit 54 shares the electrical characteristics by transmitting the electrical characteristics to the previous segment SGb and the subsequent segment SGa that are other segments and receiving the electrical characteristics from the previous segment SGb and the subsequent segment SGa, and compares these electrical characteristics. Therefore, even if the electrical characteristics vary due to variations in the degree of coupling between the power transmitting coil 40 and the power receiving coil 240 or due to the effect of noise, it can be accurately determined whether the electrical characteristics in the subject segment SGt that is subjected to abnormality determination are abnormal or normal. In addition, no new additional circuit is required.

In the present embodiment, the abnormality determination unit 54 determines whether the electrical characteristics in the subject segment SGt to which the abnormality determination unit 54 belongs and which is subjected to abnormality determination are within the range acquired from the error range acquired from the electrical characteristics in the previous segment SGb and the error range acquired from the electrical characteristics in the subsequent segment SGa, thereby determining whether the electrical characteristics in the subject segment SGt that is subjected to abnormality determination are abnormal. This leads to an easy and simple determination.

Figure 8:
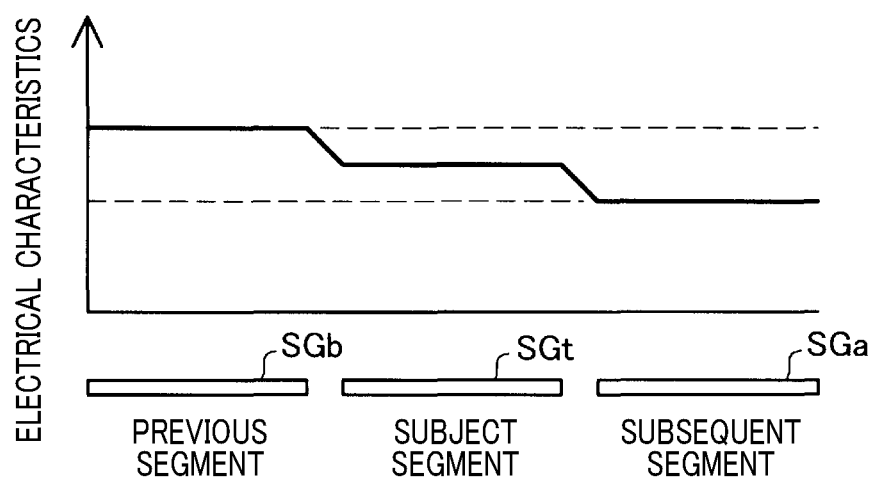
FIG. 8 is an illustration of another method of determining whether electrical characteristics are abnormal.

As illustrated in FIG. 8, the abnormality determination unit 54 may determine whether the electrical characteristics in the subject segment SGt that is subjected to abnormality determination are abnormal by determining whether the electrical characteristics in the subject segment SGt are between the electrical characteristics in the previous segment SGb and the electrical characteristics in the subsequent segment SGa. For example, when the vehicle 202 is moving on a bumpy surface of a road or is making a lane change, the distance between the transmission coil 40 and the receiving coil 240 changes and the coupling constant thus changes. Hence, as illustrated in FIG. 8, the acceptable range for determining whether the electrical characteristics in the subject segment SGt that is subjected to abnormality determination are abnormal may be increased. In this case, the electrical characteristics are monotonically decreasing from the electrical characteristics in the previous segment SGb through the electrical characteristics in the subject segment SGt that is subjected to abnormality determination, to the electrical characteristics in the subsequent segment SGa. Such a monotonic decrease in the electrical characteristics makes it easy to make a determination as whether the electrical characteristics are abnormal. Instead, the electrical characteristics may monotonically increase from the electrical characteristics in the previous segment SGb through the electrical characteristics in the subject segment SGt that is subjected to abnormality determination, to the electrical characteristics in the subsequent segment SGa.

In a case where the power to be fed changes, for example, in a case where a power command value is changed, the electrical characteristics are liable to be determined to be abnormal even if the segment SG is normal. Therefore, the abnormality determination unit 54 may not make a determination. In addition, in a case where the vehicle 202 is assumed to turn on the blinker and make a lane change, the steering angle of the steering wheel exceeding a threshold leads to a change in the relative position between the transmission coil 40 and the power receiving coil 240 changes, and thus leads to a change in the distance between the transmission coil 40 and the power receiving coil 240. Thus, even if the segment SG is normal, the electrical characteristics are liable to be determined to be abnormal. Therefore, the abnormality determination unit 54 may not make a determination.

According to the present embodiment, it is possible to determine what kind of abnormality has occurred in which circuit by analyzing which electrical characteristics have become abnormal.

According to the present embodiment, the abnormality determination unit 54 determines that there is an abnormality when the number of times the electrical characteristics determined to be abnormal exceeds the determination value N1, which allows erroneous determinations due to the effects of variation and noise to be suppressed.

According to the present embodiment, the abnormality determination unit 54 resets the number of times the electrical characteristics are determined to be abnormal to zero when the electrical characteristics are determined to be normal a predefined number of consecutive times (M consecutive times), which allows erroneous determinations due to the effects of variation and noise to be suppressed.

In the above description, the abnormality determination unit 54 receives from the previous segment SGb and the subsequent segment SGa the electrical characteristics, that is, the input voltage Vi_inv of the inverter circuit 32, the input current Ii_inv of the inverter circuit 32, the output voltage Vo_inv of the inverter circuit 32, the output current Io_inv of the inverter circuit 32, the current Io_inv of the power transmitting coil 40, and the voltage Vo_inv of the power transmitting coil 40, thereby sharing the electrical characteristics to determine whether there is an abnormality in the subject segment SGt. In an alternative embodiment, the abnormality determination unit 54 may receive from the vehicle 202 the voltage Vi_inv of the receiving coil 240, the current Ii_inv of the receiving coil 240, and the current Io_rec of the rectifier circuit 232 in power transfer between the vehicle 202 and the respective segments (the subject segment SGt that is subjected to abnormality determination, and the segments SGb and SGa previous to and subsequent to the subject segment SGt), and share the electrical characteristics to determine whether there is an abnormality in the subject segment SGt that is subjected to abnormality determination.

Figure 9:
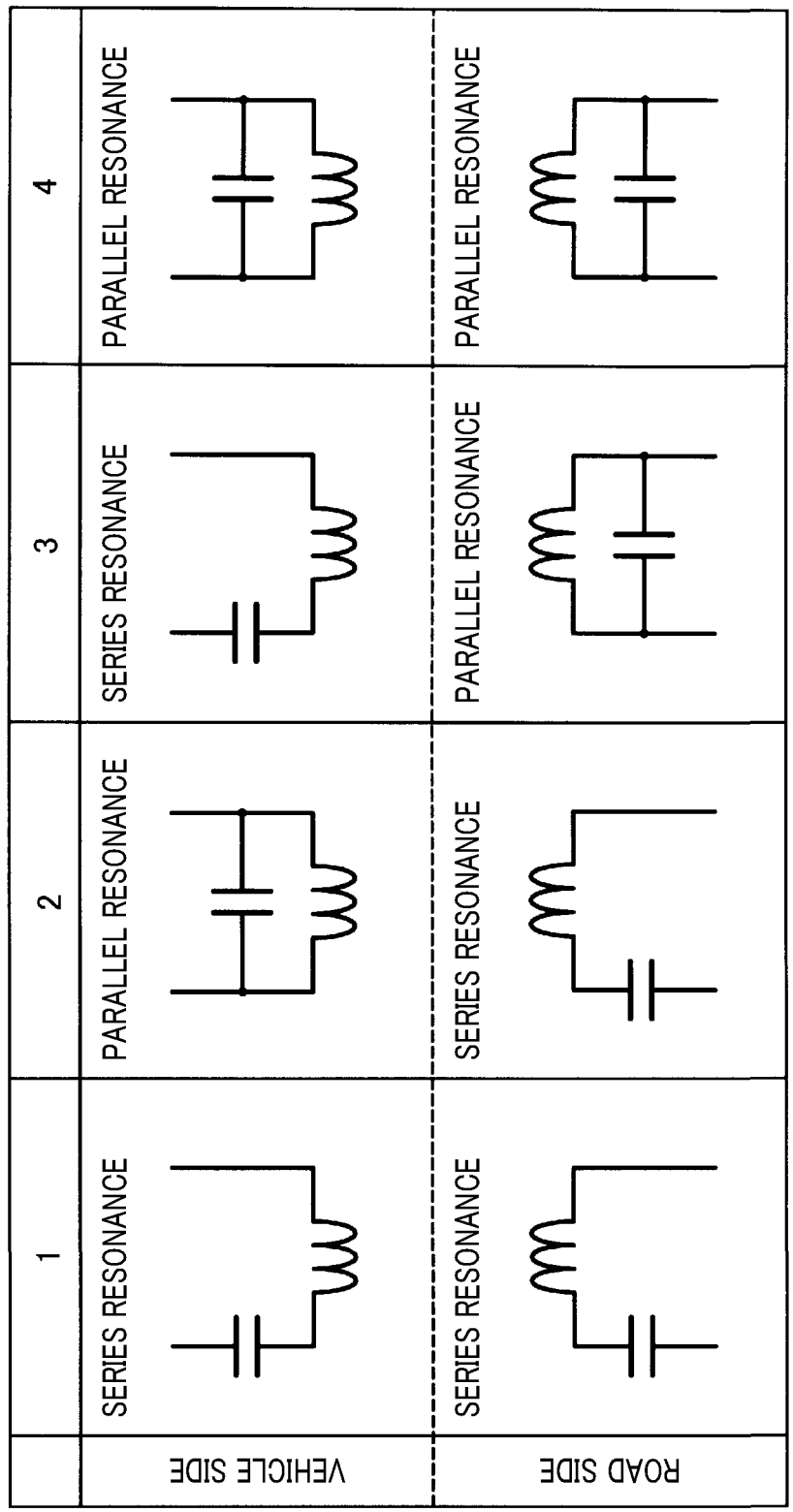
FIG. 9 is an illustration of example combinations of a resonant circuit on the power transmitting side and a resonant circuit on the power receiving side.

In the above description, it is assumed that the power transmitting coil 40 and the resonant circuit 36 of the in-motion power supply system 100 on the road 105 side are in series resonance, and that the power receiving coil 240 and the resonant circuit 236 of the in-motion power receiving system 200 on the vehicle 202 side are also in series resonance. Here, as illustrated in FIG. 9, the transmission coil 40 and the resonant circuit 36 of the in-motion power supply system 100 on the road 105 side may be either in series resonance or in parallel resonance, and the power receiving coil 240 and the resonant circuit 236 of the in-motion power receiving system 200 on the vehicle 202 side may be either in series resonance or in parallel resonance.

Second Embodiment

Figure 10:
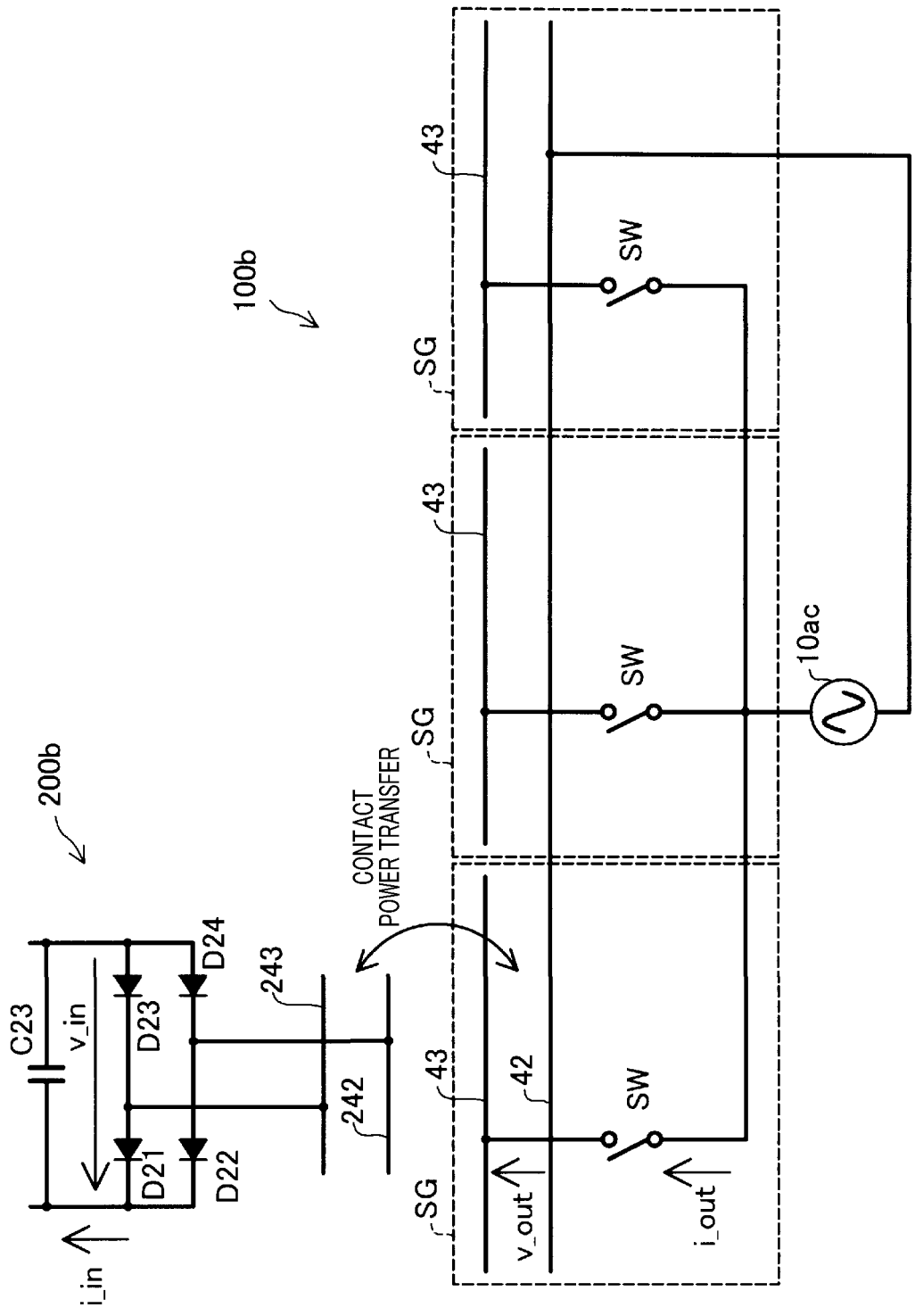
FIG. 10 is an illustration of an example circuit for contact AC power transfer.

In the above description, power transfer between the in-motion power supply system 100 on the road 105 side and the in-motion power receiving system 200 on the vehicle 202 side is implemented in a contactless manner, but instead power transfer between the in-motion power supply system 100 on the road 105 side and the in-motion power receiving system 200 on the vehicle 202 side may be implemented in a contact manner as illustrated in FIG. 10. In the example illustrated in FIG. 10, each segment SG of the in-motion power supply system 100b on the road 105 side does not include the power transmitting coil 40, the resonant circuit 36, the filter circuit 34, and the inverter circuit 32, but includes a switch SW and power transmitting terminals 42 and 43. The switch is configured to switch between conduction and non-conduction of electric power from an AC power source 10ac to the transmission terminals 42 and 43. The in-motion power receiving system 200 on the vehicle 202 side does not include the power receiving coil 240, the resonant circuit 236, and the filter circuit 234, but instead includes power receiving terminals 242 and 243 that can contact the power transmitting terminals 42 and 43. That is, electric power of the AC power source 10ac is fed to the in-motion power receiving system 200 on the vehicle 202 side by contact between the power transmitting terminals 42 and 43 and the power receiving terminals 242 and 243. Also in such a system in which electric power is fed in the contact manner, the abnormality determination unit 54 can compare the electric characteristics in the three segments by sharing the electric characteristics with the previous and subsequent segments SGb and SGa, and can determine whether there is an abnormality in the subject segment SGt that is subjected to abnormality determination.

Figure 11:
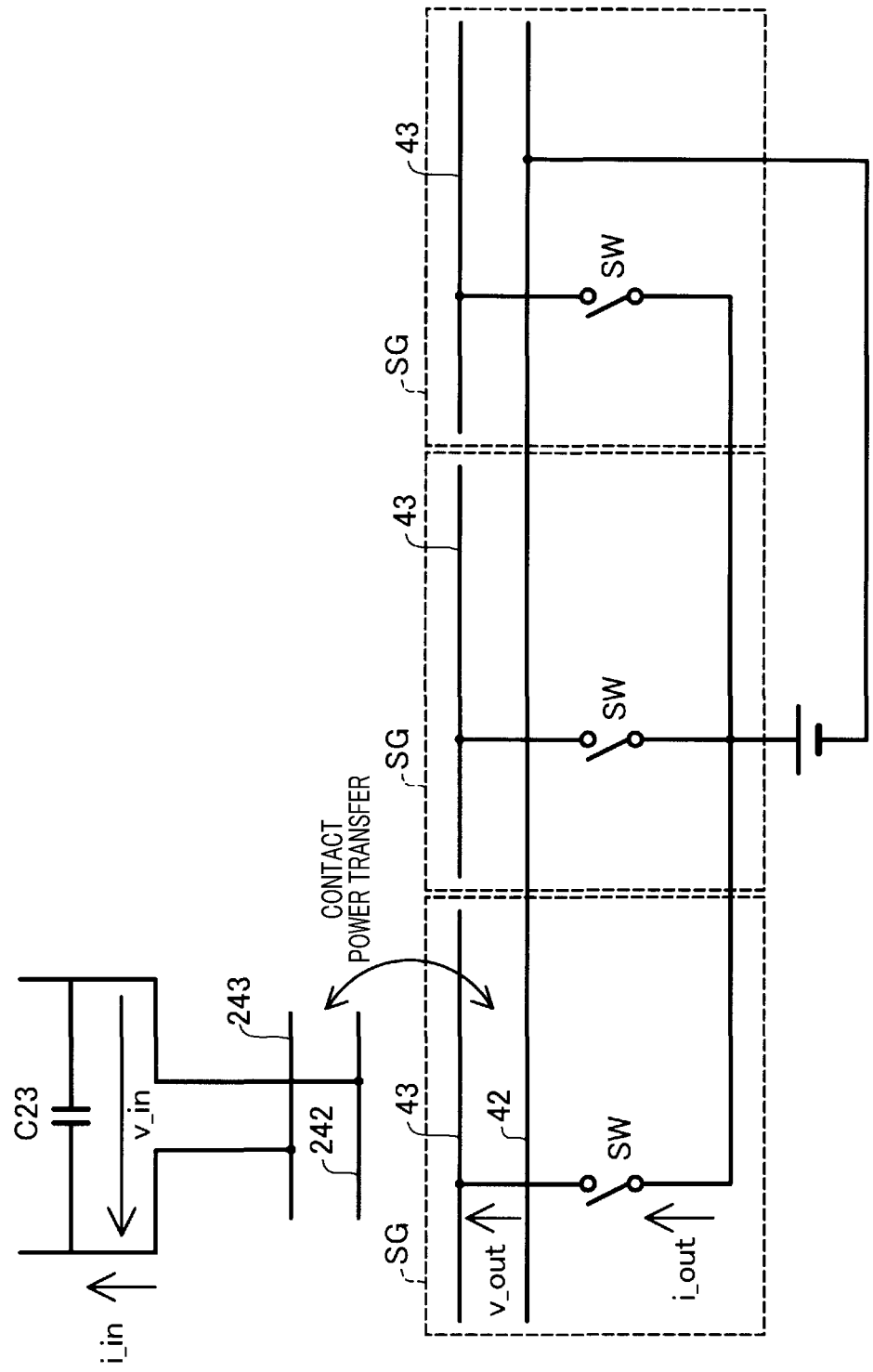
FIG. 11 is an illustration of an example circuit for contact DC power transfer.

In the case of the contact-type system, in addition to the system for feeding AC power illustrated in FIG. 10, the system for feeding DC power illustrated in FIG. 11 may be used. Similarly, the abnormality determination unit 54 can compare the electrical characteristics in the three segments by sharing the electrical characteristics with the previous and subsequent segments SGb and SGa, and determine whether there is an abnormality in the subject segment SGt that is subjected to abnormality determination. Even in the system for feeding DC electric power, the vehicle 202 may include the rectifier circuit 232. Even in a case where the positive power transmitting terminal 42 on the road 105 side contacts the negative power receiving terminal 243 on the vehicle 202 side and the negative power transmitting terminal 43 on the road 105 side contacts the positive power receiving terminal 243 on the vehicle 202 side, a correct voltage is applied by the rectifying circuit 232 to the circuit inside the vehicle 202.

As above, the abnormality determination described in the above embodiment can be employed regardless of whether the system is of the contactless type or of the contact type.

In each of the above-described embodiments, the abnormality determination unit 54 determines whether there is an abnormality in the subject segment SGt by using current and voltage measurements. In some embodiments where feedback control is performed in the power transfer control, it may be determined where there is an abnormality in the subject segment SGt by comparing controlled variables such as a duty cycle of the inverter circuit 32.

In each of the above-described embodiments, the abnormality determination unit 54 determines whether the electrical characteristics in the subject segment SGt are abnormal by using a threshold value in a range defined from the electrical characteristics in the previous segment SGb and the electrical characteristics in the subsequent segment SGa. In some embodiments, the abnormality determination unit 54 may determine whether the electrical characteristics in the subject segment SGt are abnormal by comparing the electrical characteristics in the subject segment SGt with at least either the electrical characteristics in the previous segment SGb or the electrical characteristics in the subsequent segment SGa. In such embodiments, the abnormality determination unit 54 may determine whether the electrical characteristics in the subject segment SGt are abnormal by using a threshold value in a range set from the electrical characteristics in the previous segment SGb or the subsequent segment SGa.

The present disclosure is not limited to any of the embodiments, examples or modifications described above but may be implemented by a diversity of other configurations without departing from the scope of the disclosure. For example, the technical features of the embodiments, examples or modifications corresponding to the technical features of the respective aspects may be replaced or combined appropriately, in order to solve part or all of the issues described above or in order to achieve part or all of the advantages described above. Any of the technical features may be omitted appropriately unless the technical feature is described as essential herein.

Each of the control unit 220, the vehicle position detection unit 20, the abnormality determination unit 54, and other functional blocks of the contactless power supply system 300 and the method thereof described in the present disclosure may be implemented by a dedicated computer composed of a processor and memory that are programmed to implement one or more functions embodied by a computer program. Alternatively, each of the control unit 220, the vehicle position detection unit 20, the abnormality determination unit 54, and other functional blocks of the contactless power supply system 300 and the method thereof described in the present disclosure may be implemented by a dedicated computer composed of a processor composed of one or more dedicated hardware logic circuits. Alternatively, each of the control unit 220, the vehicle position detection unit 20, the abnormality determination unit 54, and other functional blocks of the contactless power supply system 300 and the method thereof described in the present disclosure may be implemented by one or more dedicated computers composed of a combination of a processor and memory that are programmed to implement one or more functions with a processor composed of one or more hardware logic circuits. Furthermore, the computer program may be stored in a computer readable non-transitory tangible storage medium as instructions executed by a computer.

The present disclosure is not limited to any of the embodiments, the examples and the modifications described above but may be implemented by a diversity of other configurations without departing from the scope of the disclosure. For example, the technical features of the embodiments, examples or modifications corresponding to the technical features of the respective aspects may be replaced or combined appropriately, in order to solve part or all of the issues described above or in order to achieve part or all of the advantages described above. Any of the technical features may be omitted appropriately unless the technical feature is described as essential herein.

What is claimed is:

1. An in-motion power supply system comprising:
   a plurality of power supply segments configured to supply power to a vehicle;
   a vehicle position detection unit configured to detect a position of the vehicle relative to each of the power supply segments;
   an electrical characteristic acquisition unit configured to acquire electrical characteristics in a power supply segment involved in power transfer when electric power is supplied to the vehicle from the plurality of power supply segments; and
   an abnormality determination unit that uses the electrical characteristics to determine whether there is an abnormality in the power supply segment involved in power transfer, the abnormality determination unit being configured to:
   share the electrical characteristics between a subject segment which is the power supply segment subjected to abnormality determination and at least one of a previous segment, which is a power supply segment that was involved in power transfer previous to the subject segment and a subsequent segment, which is a power supply segment that will be involved in power transfer subsequent to the subject segment; and
   compare the electrical characteristics in the subject segment with at least either the electrical characteristics in the previous segment or the electrical characteristics in the subsequent segment to determine whether the electrical characteristics in the subject segment are abnormal.

2. The in-motion power supply system according to claim 1, wherein
   the abnormality determination unit is configured to determine whether the electrical characteristics in the subject segment are abnormal by using a threshold value in a range defined from the electrical characteristics in the previous segment and the electrical characteristics in the subsequent segment.

3. The in-motion power supply system according to claim 1, wherein
   the subject segment, the previous segment, and the subsequent segment are arranged in a row.

4. The in-motion power supply system according to claim 2, wherein
   the abnormality determination unit is configured to count the number of times the electrical characteristics are determined to be abnormal, and in response to the number of times the electrical characteristics are determined to be abnormal becoming or exceeding a predefined number of times, determine that there is an abnormality in the subject segment.

5. The in-motion power supply system according to claim 4, wherein
the abnormality determination unit is configured to count the number of times the electrical characteristics are determined to be abnormal, and in response to the number of times the electrical characteristics are determined to be abnormal becoming or exceeding a predefined number of times during a predefined number of determinations.

6. The in-motion power supply system according to claim 4, wherein
the abnormality determination unit is configured to, in response to the electrical characteristics being determined to be normal a predefined number of consecutive times, reset the number of times the electrical characteristics are determined to be abnormal to zero.

7. The in-motion power supply system according to claim 1, wherein
each power supply segment includes an inverter circuit and a power transmitting coil to contactlessly supply power to the vehicle, and
the electrical characteristics are at least one of an input voltage and an input current of the inverter circuit.

8. The in-motion power supply system according to claim 1, wherein
each power supply segment includes an inverter circuit and a power transmitting coil to contactlessly supply power to the vehicle, and
the electrical characteristics are at least one of an output voltage and an output current of the inverter circuit.

9. The in-motion power supply system according to claim 1, wherein
each power supply segment includes an inverter circuit and a power transmitting coil to contactlessly supply power to the vehicle, and
the electrical characteristics are at least one of a voltage and a current of the power transmitting coil.

10. The in-motion power supply system according to claim 1, wherein
the vehicle includes a power receiving coil and a rectifier circuit to contactlessly receive power from each power supply segment, and
the electrical characteristics are at least one of a voltage and a current of the power receiving coil acquired from the vehicle.

11. The in-motion power supply system according to claim 1, wherein
the vehicle includes a power receiving coil and a rectifier circuit to contactlessly receive power from each power supply segment, and
the electrical characteristics are a current of the rectifier circuit acquired from the vehicle.

12. The in-motion power supply system according to claim 1, wherein
each power supply segment includes an inverter circuit and a power transmitting coil to contactlessly supply power to the vehicle,
the vehicle includes a power receiving coil and a rectifier circuit to contactlessly receive power from each power supply segment,
the abnormality determination unit is configured to use, as the electrical characteristics, one or more of an input voltage, an input current, an output voltage, and an output current of the inverter circuit, a voltage and a current) of the power transmitting coil, a voltage and a current of the power receiving coil acquired from the vehicle, and a current of the rectifier circuit acquired from the vehicle.

13. An abnormality determination method for determining whether electrical characteristics in any of a plurality of power supply segments in an in-motion power supply system are abnormal, the method comprising:
acquiring electrical characteristics in a power supply segment involved in power transfer when electric power is supplied to a vehicle from the plurality of power supply segments;
sharing the electrical characteristics between a subject segment which is the power supply segment subjected to abnormality determination, a previous segment which is a power supply segment that was involved in power transfer previous to the subject segment, and a subsequent segment, which is a power supply segment that will be involved in power transfer subsequent to the subject segment; and
comparing the electrical characteristics in the subject segment with at least either the electrical characteristics in the previous segment or the electrical characteristics in the subsequent segment to determine whether the electrical characteristics in the subject segment are abnormal.

\* \* \* \* \*